(12) United States Patent
Whittle-Herbert

(10) Patent No.: US 6,508,426 B1
(45) Date of Patent: Jan. 21, 2003

(54) FISHING REEL

(76) Inventor: Giles Whittle-Herbert, 509 Acacia Crescent, Victoria Falls (ZW)

( * ) Notice: Subject to any disclaimer, the term of this patent is extended or adjusted under 35 U.S.C. 154(b) by 0 days.

(21) Appl. No.: 09/890,204

(22) PCT Filed: Jul. 28, 1999

(86) PCT No.: PCT/IB99/01337

§ 371 (c)(1),
(2), (4) Date: Nov. 30, 2001

(87) PCT Pub. No.: WO00/65909

PCT Pub. Date: Nov. 9, 2000

(30) Foreign Application Priority Data

Apr. 29, 1999 (ZA) .............................................. 99/3002

(51) Int. Cl.[7] .............................................. A01K 89/01
(52) U.S. Cl. ...................................... 242/317; 242/321
(58) Field of Search ................................ 242/317, 321, 242/264, 269

(56) References Cited

U.S. PATENT DOCUMENTS

| | | | |
|---|---|---|---|
| 3,727,473 A | | 4/1973 | Bayer |
| 4,148,228 A | | 4/1979 | Freeman |
| 4,728,054 A | * | 3/1988 | Pisapio ........................ 242/317 |
| 4,750,687 A | * | 6/1988 | Sievert et al. .............. 242/317 |
| 5,626,303 A | * | 5/1997 | Bringsen ..................... 242/317 |
| 5,857,632 A | * | 1/1999 | Arkowski .................... 242/317 |
| 6,168,105 B1 | * | 1/2001 | Nydegger .................... 242/317 |

FOREIGN PATENT DOCUMENTS

FR            1022892            3/1953

* cited by examiner

Primary Examiner—Emmanuel Marcelo
(74) Attorney, Agent, or Firm—Dean W. Russell; Kilpatrick Stockton LLP

(57) ABSTRACT

This invention relates to a fishing reel (10) which comprises a reel body (12), a spool (14) rotatable relative to the reel body, a handle (16) for rotating the spool, and a drive bearing (32) connecting the handle to the spool. The drive bearing (32) is in the form of a ball-bearing including a plurality of balls (34) which are mounted to the handle (16) and which are arranged to rotate so that rotation of the handle (16) at a first velocity is transferred to the spool (14) at a second velocity greater than the first velocity.

12 Claims, 4 Drawing Sheets

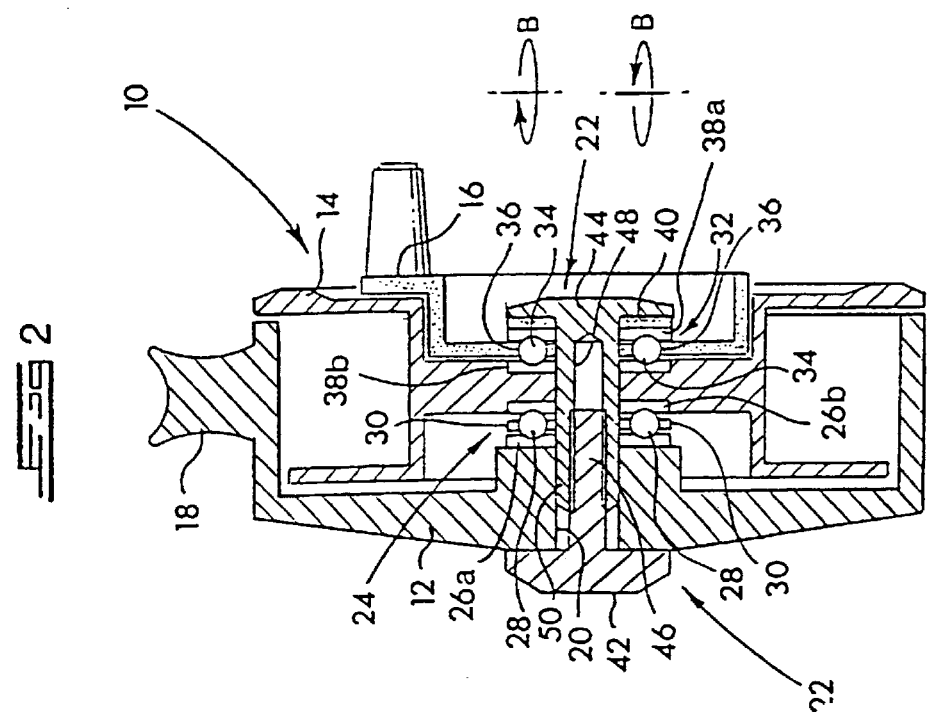
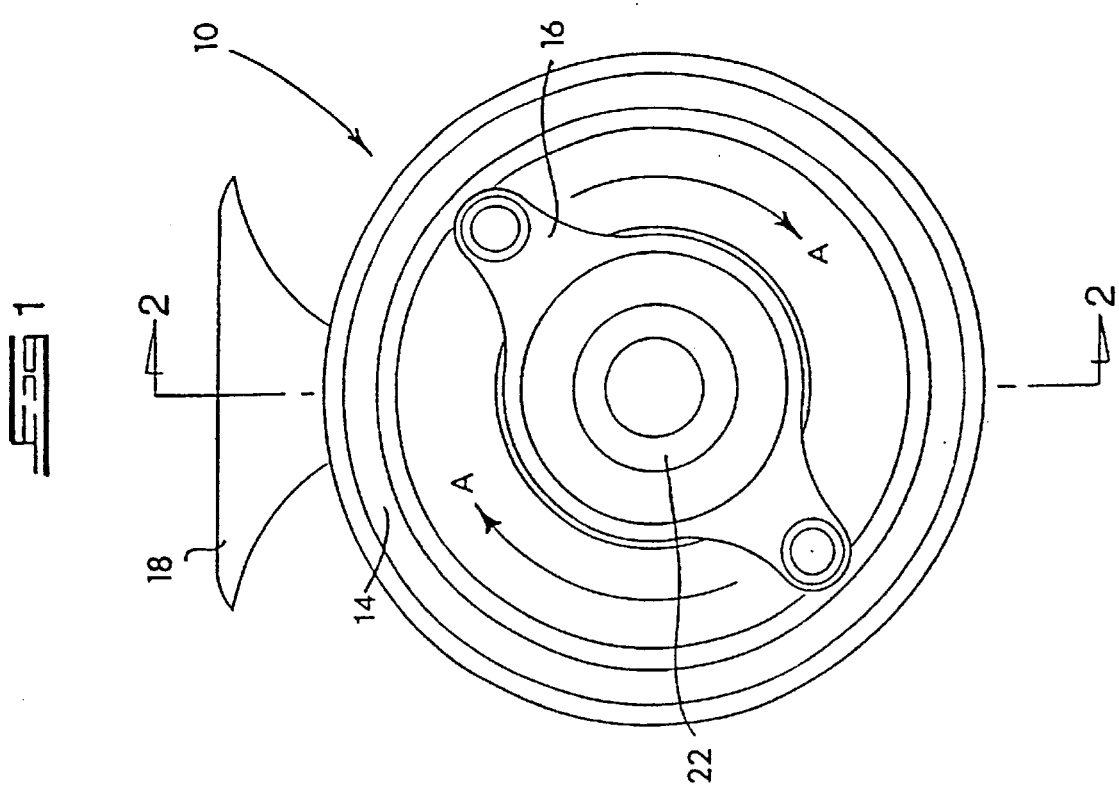

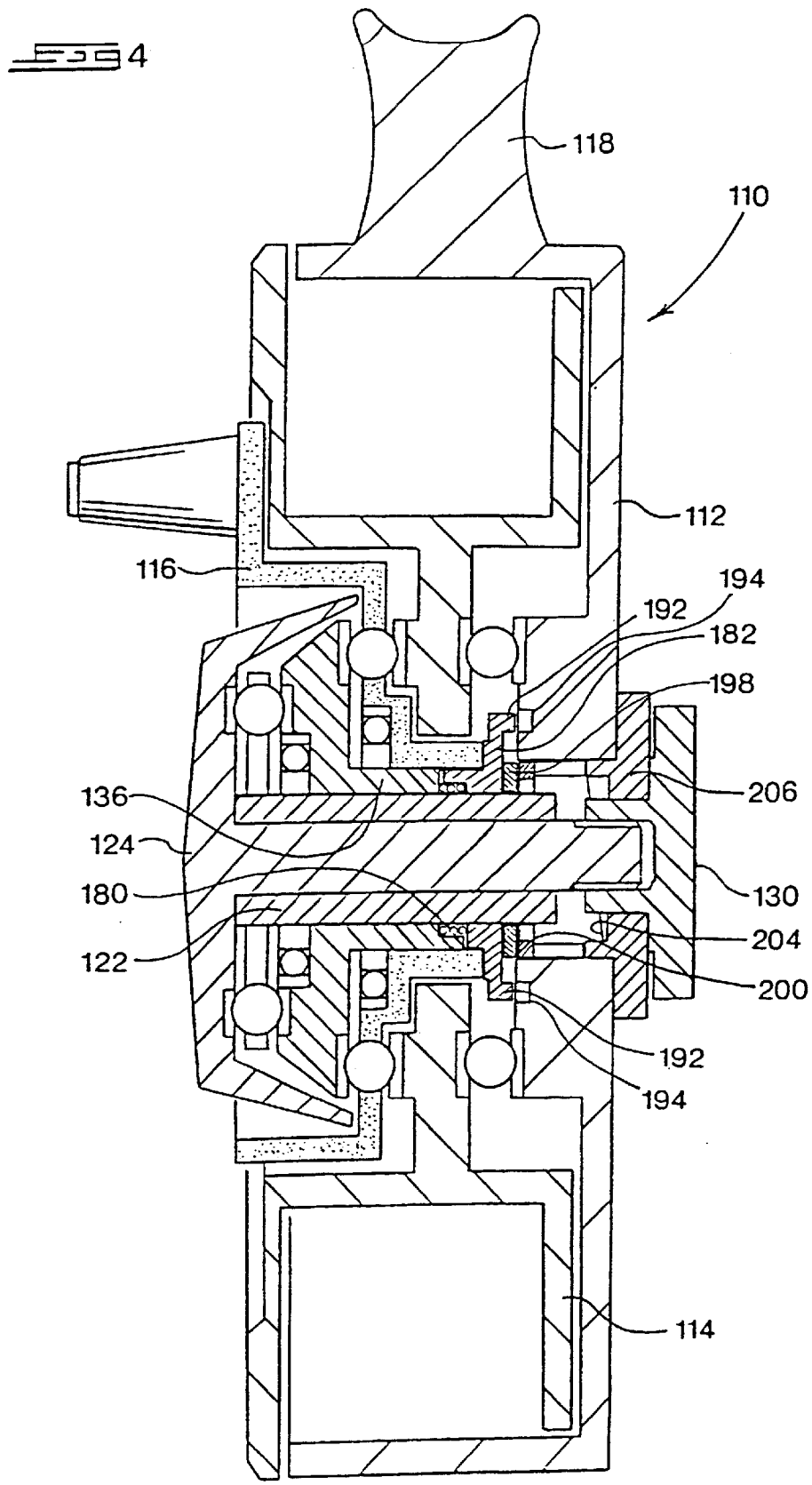

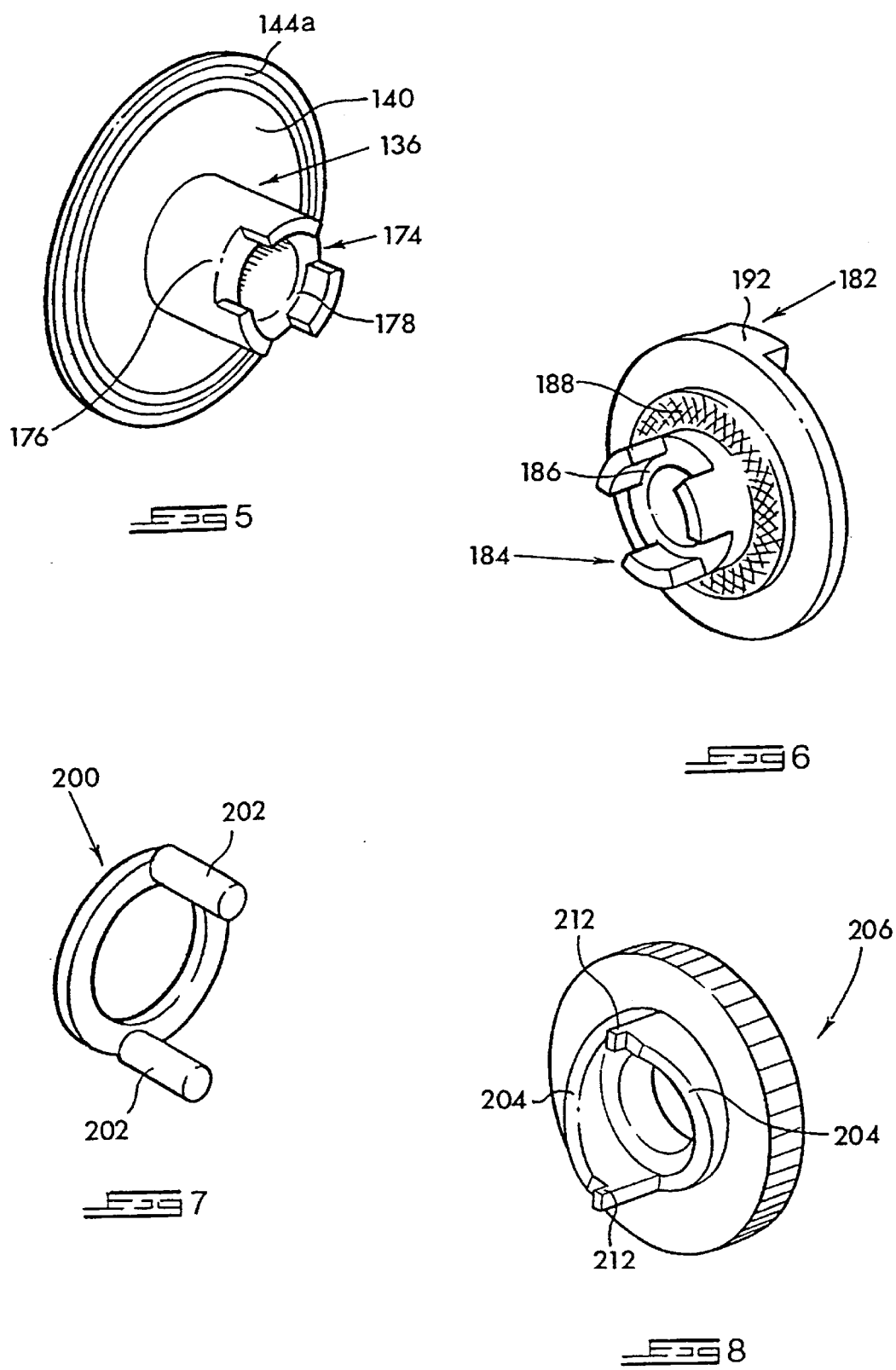

FISHING REEL

This application claims priority to South African Patent Application No. 99/3002 filed on Apr. 29, 1999 and International Application No. PCT/IB99/01337 filed on Jul. 28, 1999 and published in English as International Publication No. WO 00/65909 on Nov. 9, 2000.

BACKGROUND OF THE INVENTION

THIS invention relates to a fishing reel.

Conventional fishing reels have a reel body which is attachable to a fishing rod, a spool which is rotatable relative to the reel body and a handle for rotating the spool. Normally, the handle is connected to the spool via a gear which is arranged to transfer rotation of the handle to the spool. This gear tends to make known fishing reels relatively expensive to manufacture and includes a number of wear parts which can become damaged or worn.

It is an object of the Present invention to provide a fishing reel with an alternative mechanism for transferring rotation of the handle to the spool which is simple in construction, relatively inexpensive, and strong and durable.

SUMMARY OF THE INVENTION

According to the invention there is provided a fishing reel which is operable in one or more modes comprising:

a reel body;

a spool rotatable relative to the reel body;

a handle for rotating the spool; and a drive bearing connecting the handle to the spool, the drive bearing including a plurality of balls and/or rollers which are mounted to the handle and which are arranged to rotate in at least one of the one or more modes of operation so that rotation of the handle at a first velocity is transferred to the spool at a second velocity greater than the first velocity.

In one embodiment of the invention, the plurality of balls and/or rollers are arranged to bear against a pair of spaced-apart bearing races, one of which is rotatably fixed relative to the reel body, and the other of which is connected to the spool. In this case, the fishing reel is designed to operate in one mode only.

In another embodiment, one bearing race for the balls and/or rollers is connected to the spool and another is arranged so that it can be selectively fixed relative to the handle or the reel body. In this embodiment, the reel can be operated in two modes. In one of the modes of operation the balls and/or rollers are rotatable so that rotation of the handle at a first velocity is transferred to the spool at a second velocity greater than the first velocity, and in the other mode of operation the balls and/or rollers are held between the bearing races so that rotation of the handle at a first velocity is transferred directly to the spool at the first velocity.

The bearing race which can be fixed relative to the handle or the reel body may be located on a rotatable member which is connectable to the reel body or the handle by means of a switching device. In one arrangement, the switching device is axially movable between a first position in which it engages the reel body so as to be rotatably fixed relative to the reel body, and a second position in which it is disengaged from the reel body and is rotatably fixed relative to the handle.

Preferably, the reel includes at least one anti-reverse bearing which is arranged to allow the handle to rotate in one direction only.

In a particularly preferred form of the invention, the reel includes an adjustable drag unit which is arranged to apply lateral loads to the spool via the drive bearing so as to resist rotation of the spool. In this case, a thrust bearing may be provided between the spool and the reel body.

The drag unit may comprise two members which are threadably engageable with one another, one of the members being linked to the reel body and the other of the members being linked to the handle so that suitable rotation of the drag unit members relative to one another causes the members to be drawn together and to apply a clamping load to the spool between the handle and the reel body.

BRIEF DESCRIPTION OF THE DRAWINGS

The invention will now be described in more detail, by way of example only, with reference to the accompanying drawings in which:

FIG. 1 shows a side view of a fishing reel according to the present invention;

FIG. 2 shows a cross-sectional view along the line 2—2 in FIG. 1;

FIGS. 3 and 4 show cross-sectional views of a fishing reel according to another embodiment of the invention; and FIGS. 5 to 8 show perspective views of various components of the fishing reel illustrated in FIGS. 3 and 4.

DESCRIPTION OF THE PREFERRED EMBODIMENTS

Figure 3:
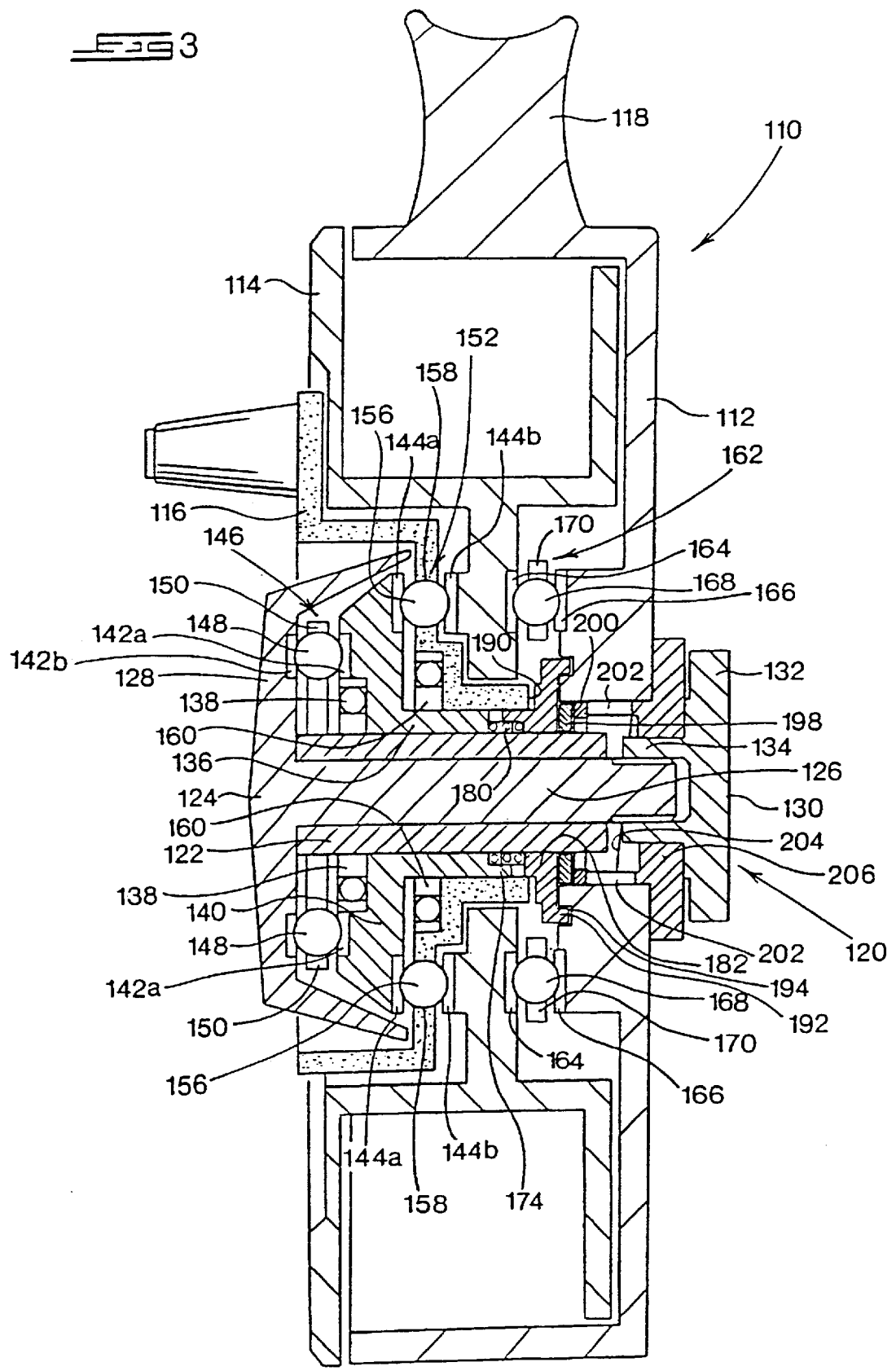

FIGS. 1 and 2 of the drawings illustrate a fishing reel 10 according to the present invention. The reel 10 is in the form of a centre-pin reel and includes a reel body 12, a spool 14 which is rotatable relative to the body 12, and a handle 16 for rotating the spool.

The body of the reel 12 carries a connector 18 for connecting the reel to conventional fittings (not shown) on a fishing rod (also not shown). In FIG. 2 of the drawings, the body 12 is seen to include an opening 20 which extends through a central region of the reel body to accommodate an adjustable drag unit 22 which is described in more detail below.

A thrust bearing which is designated generally with the reference numeral 24 is located between the reel body 12 and the spool 14, as illustrated. This bearing is in the form of a ball-bearing and includes a pair of bearing races 26a and 26b, a set of balls 28 which are arranged to run along the bearing races, and a carrier 30 for holding the balls 28 apart from one another. The bearing race 26a is fixed to the reel body 12 and the bearing race 26b is fixed to the spool 14 so that these races rotate relative to one another when the spool is rotated relative to the reel body.

On the other side of the spool 14, a drive bearing 32 (also in the form of a ball-bearing) is located between the spool and a portion of the drag unit 22. The bearing 32 includes a set of balls 34 which are mounted in a circular configuration in apertures 36 in the handle 16 and which bear against a pair of bearing races 38a and 38b. The bearing race 38a is connected to a resilient lining 40 fixed to the drag unit 22 and the bearing race 38b is fixed to the spool 14.

The drag unit 22 comprises a first member 42 and a second member 44. The first member is linked to the reel body 12 and has a threaded shaft 46 which is arranged to extend through the opening 20 in the reel body, as shown, and the second member is linked to the handle 16 and defines a threaded socket 48 for threadably engaging the shaft 46 on the first member. When the members 42 and 44 are threadably engaged with one another in the manner illustrated in FIG. 2, they apply a clamping load to the spool 14 between the reel body 12 and the handle 16, and this clamping load serves to provide resistance to the rotation of the spool.

The opening 20 in this embodiment has a square cross section and an end portion 50 of the second drag unit member 44 has a corresponding square cross section so that when the portion 50 is located within the opening 20, the member 44 is rotatably fixed relative to the reel body 12. Accordingly, by rotating the member 42 relative to the reel body 12, the members 42 and 44 can be drawn towards or away from one another, as the case may be. It will be appreciated that as the member 44 is drawn towards the member 42, the clamping load applied to the spool 14 is increased, and as the member 44 is drawn away from the member 42, the clamping load is reduced.

In practice, the drag unit 22 is adjusted so that there is sufficient friction between the components of the drive bearing 32 to transfer rotation of the handle 16 to the spool 14. In this condition of the reel, the handle can be used to wind fishing line (not shown) onto the spool.

Since the bearing race 38a is fixed to the drag unit member 44, and therefore is rotatably fixed relative to the reel body 12, rotation of the handle 16 in the direction of the arrows A in FIG. 1 causes the balls 34 to rotate in the direction of the arrows B in FIG. 2. Accordingly, in addition to transferring the rotation of the handle 16 to the spool 14, the balls 34 also impart their own rotation to the spool, thereby causing the spool to rotate at a faster rate than the handle. In this way, each complete revolution of the handle results in more than one complete revolution of the spool, and this allows fishing line to be wound onto the spool relatively quickly.

If while fishing it becomes necessary to allow fishing line off the spool, for example while playing a fish hooked on the line, the drag unit 22 can be adjusted manually by rotating the member 42 so as to apply a suitable resistance to the spool as fishing line is drawn off the spool.

FIGS. 3 to 8 of the accompanying drawings illustrate another embodiment of the fishing reel according to the present invention. As in the case of the previous embodiment, the reel 110 includes a reel body 112 carrying a connector 118 for connecting the reel to a fishing rod (not shown), a spool 114 which is rotatable relative to the body 112, and a handle 116 for rotating the spool.

An adjustable drag unit 120 extends through the reel, as shown, and carries a collar 122 along a portion of its length. The drag unit 120 includes a first member 124 which has a partially threaded shank 126 extending from a head 128, and a second member 130 defining a head 132 and a threaded socket 134 for threadably engaging the shank 126.

A rotatable sleeve 136 is connected to the collar 122 by means of an anti-reverse bearing 138 and has a flange 140 at one end which carries a pair of bearing races 142a and 144a. A ball-bearing designated generally with the reference numeral 146 is located between the flange 140 and the head 128 of the drag unit member 124. This bearing includes the bearing race 142a, another bearing race 142b on the head 128, a set of balls 148 which are arranged to bear against the bearing races 142a and 142b, and a carrier 150 for holding the balls apart from one another.

A drive bearing 152 (also in the form of a ball-bearing) is located between the flange 140 and the spool 114. This bearing includes the bearing race 144a, another bearing race 144b on the spool 114, and a set of balls 156 which are mounted in a circular configuration in apertures 158 in the handle 116 and which bear against the bearing races 144a and 144b.

The handle 116 and the sleeve 136 are connected to one another by means of an anti-reverse bearing 160 in a similar fashion to that in which the sleeve 136 is connected to the collar 122.

On the other side of the spool 114, a thrust bearing 162 links the spool to the reel body. The thrust bearing comprises a bearing race 164 on the spool 114, a bearing race 166 on the reel body 112, and a set of balls 168 mounted in a carrier 170.

With reference now also to FIG. 5 of the accompanying drawings which illustrates the rotatable sleeve 136, a dog 174 extends from an end 176 of the sleeve, as illustrated, so as to define a shoulder 178 which is sized and shaped to receive a compression coil spring 180 (see FIGS. 3 and 4).

FIG. 6 of the drawings illustrates a switching device 182 for allowing the sleeve 136 to be selectively fixed relative to the reel body 112 or the handle 116. The device 182 can be seen to include a dog 184 similar to the dog 174 on the sleeve 136. The dogs 174 and 184 are designed to interlock with one another so as to rotatably fix the sleeve 136 relative to the device 182 and simultaneously allow for limited axial displacement of these components relative to one another. The switching device 182, similarly to the sleeve 136, defines a shoulder 186 for receiving the coil spring 180 so that the spring is sandwiched between the sleeve and the switching device. A rough, handle engaging surface 188 is provided around the dog 184, as shown, for engaging a similar, rough surface defined on an end 190 of the handle 116, and a pair of locking limbs 192 (which are illustrated most clearly in FIGS. 3 and 4) are arranged so as to be insertable into and withdrawable from a pair of corresponding recesses 194 defined in the reel body 112. The length of each recess 194 is substantially greater than the length of each locking limb 192 so as to facilitate the entry of these limbs into the recesses during rotation of the switching device relative to the reel body.

The switching device 182 bears against a Teflon™ washer 198 which in turn bears against an annular member 200 carrying two locating legs 202. The member 200 is illustrated in FIG. 7 in which the legs 202 can be seen to extend radially beyond the outer periphery of the annular member. The reel body 112 defines a pair of locating grooves (not visible) which are sized and shaped to receive the portions of the legs 202 standing proud of the annular member 200 so that these legs are slidable axially within the grooves. With the legs 202 located within the locating grooves, the annular member is axially slidable but rotatably fixed relative to the reel body.

The legs 202 are arranged to bear against two cams 204 on an actuator 206 which is illustrated most clearly in FIG. 8. The cams 204 are designed so that as the actuator is rotated the legs 202 (and hence the annular member 200) are displaced axially to the left or to the right in FIGS. 3 and 4, as the case may be. Each cam includes an end stop 212 for limiting the rotational displacement of the actuator 206 relative to the legs 202.

In use, the fishing reel 110 can be operated in two modes. In a first mode, the locking limbs 192 on the switching device 182 are seated within the recesses 194 in the reel body 112, as shown in FIG. 3. In this condition of the reel, the switching device 182 is rotatably fixed to the reel body by means of the limbs 192 and rotatably fixed to the sleeve 136 by means of the dogs 172 and 184 so that the sleeve is rotatably fixed relative to the reel body. Rotation of the handle 116 in this mode causes the set of balls 156 to rotate so that, in addition to transferring the rotation of the handle 116 to the spool 114, the balls 156 also impart their own rotation to the spool. In this way, the spool is caused to rotate at a faster rate than that of the handle so that each complete revolution of the handle results in more than one complete revolution of the spool. When fishing line is drawn off the spool, for example when line is released while playing a fish, the handle 116 is prevented from rotating by the anti-reverse bearing 160.

To adjust the reel into the second mode of operation, the actuator 206 is rotated so that the cams 204 displace the legs 202 axially along the locator grooves in the reel body, thereby displacing the annular member 200 from the FIG. 3 position to the FIG. 4 position. As the annular member is displaced in this manner, it forces the washer 198 and the switching device 182 to the left in FIGS. 3 and 4 until the locking limbs 192 are withdrawn from the recesses 194, as illustrated in FIG. 4. When this occurs the coil spring between the device 182 and the sleeve 136 is compressed and the surface 188 on the switching device bears against the surface 190 on the handle. In this condition, the handle is fixed to the switching device and the sleeve so that the three components rotate together when the handle is rotated. Since the sleeve 136 is no longer fixed relative to the reel body, in this mode the balls 156 do not rotate when the handle is rotated, and consequently the rotation of the handle 112 is transferred directly to the spool 114 with no multiplication effect. Accordingly, for every complete revolution of the handle 116, there is a corresponding complete revolution of the spool 114. In this mode of the reel, the anti-reverse bearing 138 prevents the handle from rotating when fishing line is drawn off the reel.

To return the reel 110 to the first mode, the actuator 206 is simply rotated back to the position illustrated in FIG. 3. When this occurs, the coil spring 180 biases the switching device away from the sleeve 136 so that as the locking limbs become aligned with the recesses 194 during rotation of the handle, the limbs are forced into the recesses to rotatably lock the switching device relative to the reel body. As mentioned above, the recesses 194 are substantially longer than the locking limbs 192 so as to facilitate the entry of the limbs into the recesses during rotation of the handle.

The drag unit 120 can be adjusted by rotation of the members 124 and 130 relative to one another so as to increase or decrease the friction force between the balls 156 and the bearing race 154.

It will be appreciated that the mechanism for transferring rotation of the handle to the spool in either of the embodiments of the invention described above is simple in construction and relatively inexpensive to manufacture. Also, the construction of this mechanism renders it strong and durable.

What is claimed is:

1. A fishing reel which is operable in one or more modes comprising:
    a reel body;
    a spool rotatable relative to the reel body;
    a handle for rotating the spool; and
    a drive bearing connecting the handle to the spool, the drive bearing including a plurality of rollers which are mounted to the handle and which are arranged to rotate in at least one of the one or more modes of operation so that rotation of the handle at a first velocity is transferred to the spool, by means of the rollers, at a second velocity greater than the first velocity.

2. A fishing reel according to claim 1, wherein the plurality of rollers are arranged to bear against a pair of spaced-apart bearing races, one of which is rotatably fixed relative to the reel body, and the other of which is connected to the spool.

3. A fishing reel according to claim 2, wherein at least some of the rollers comprise balls.

4. A fishing reel according to claim 1, wherein the plurality of rollers are arranged to bear against a pair of spaced-apart bearing races, one of which is connected to the spool, and the other of which is arranged so that it can be selectively fixed relative to the handle or the reel body.

5. A fishing reel according to claim 3, wherein the bearing race which can be fixed relative to the handle or the reel body is located on a rotatable member which is connectable to the reel body or the handle by means of a switching device.

6. A fishing reel according to claim 5, wherein the switching device is axially movable between a first position in which it engages the reel body so as to be rotatably fixed relative to the reel body, and a second position in which it is disengaged from the reel body and is rotatably fixed relative to the handle.

7. A fishing reel according to claim 4, wherein at least some of the rollers comprise balls.

8. A fishing reel according to claim 1, including an adjustable drag unit which is arranged to apply lateral loads to the spool via the drive bearing.

9. A fishing reel according to claim 8, including a thrust bearing between the spool and the reel body.

10. A fishing reel according to claim 9, wherein the drag unit comprises two members which are threadably engageable with one another, one of the members being linked to the reel body and the other of the members being linked to the handle.

11. A fishing reel according to claim 8, wherein the drag unit comprises two members which are threadably engageable with one another, one of the members being linked to the reel body and the other of the members being linked to the handle.

12. A fishing reel according to claim 1, wherein at least some of the rollers comprise balls.

\* \* \* \* \*